United States Patent [19]

Ghisolfi

[11] Patent Number: 5,334,669
[45] Date of Patent: Aug. 2, 1994

[54] PROCESS FOR THE PRODUCTION OF HIGH MOLECULAR WEIGHT POLYESTER RESINS

[75] Inventor: Guido Ghisolfi, Tortona, Italy

[73] Assignee: M. & G. Ricerche S.p.A., Pozzilli, Italy

[21] Appl. No.: 952,619

[22] PCT Filed: Mar. 26, 1992

[86] PCT No.: PCT/EP92/00667
§ 371 Date: Nov. 25, 1992
§ 102(e) Date: Nov. 25, 1992

[87] PCT Pub. No.: WO92/17520
PCT Pub. Date: Oct. 15, 1992

[30] Foreign Application Priority Data

Mar. 29, 1991 [IT] Italy .................. MI91 A 000883

[51] Int. Cl.$^5$ .................................. C08F 20/00
[52] U.S. Cl. ........................ 525/437; 528/302; 528/481; 528/483; 528/486; 528/503; 264/211.11; 264/211.17; 264/211.21
[58] Field of Search ........... 525/437; 528/302, 503, 528/481, 483, 486; 264/211.11, 211.17, 211.21

[56] References Cited

U.S. PATENT DOCUMENTS 2,965,613  12/1960  Milone et al. .................. 528/305

FOREIGN PATENT DOCUMENTS 0422282  10/1989  European Pat. Off. .

OTHER PUBLICATIONS

Chem. Abstracts: vol. 90, 1979; 24220f.
Chem. Abstracts: vol. 80, 1974; 71956d.
Chem. Abstracts: vol. 89, 1978; 130514u.

Primary Examiner—Samuel A. Acquah
Attorney, Agent, or Firm—Edward D. Manzo; Andrew Kolomayets

[57] ABSTRACT

A process for the solid state polyaddition of a polyester resin in which the resin, blended in a molten state with a dianhydride of an aromatic tetracarboxylic acid is granulated, crystallized and then upgraded, characterized in that the crystallization and upgrading temperature is comprised in the range between the TG and 170° C., preferably between 130° and 170° C.

8 Claims, No Drawings

PROCESS FOR THE PRODUCTION OF HIGH MOLECULAR WEIGHT POLYESTER RESINS

The present invention relates to a process for the production of high molecular weight polyester resins from resins having lower molecular weight using a new polyaddition technique in the solid state.

Particularly, the invention relates to a process in which the polyester resin is blended in the molten state with an upgrading additive capable of performing the solid state polyaddition of said polyester which is then transformed into a granulate and then upgraded using the new solid state polyaddition technique.

In Applicant's previous pending European patent application EP No. 89119049.8 a solid state upgrading process for polyester resin is described in which the resin is upgraded at temperature higher than 170° C. and in general comprised in the range of 170°–220° C., in the presence of a dianhydride of an aromatic tetracarboxylic acid.

It has now been unexpectedly found that it is possible to carry out the upgrading reaction also operating at temperatures lower than 170° C.

The process of the invention comprises the steps of mixing a molten polyester resin with an upgrading additive selected from the group of the dianhydrides of aromatic tetracarboxylic acids, granulating the resin, crystallizing the granulate at temperatures above the TG and then upgrading the crystallized polyester at temperatures comprised in the range from the TG of the polyester and 170° C.

This process is preferably carried out in continuous way using continuous crystallizers and reactors where the chips are fed in counter current to a stream of a heated gas, for example air, nitrogen or carbon dioxide.

Apparatuses suitable for the crystallization and polyaddition steps can be those described in U.S. Pat. Nos. 4,161,578 and 4,064,112 whose description is herewith incorporated by reference.

The recycling of the inert gas streams can be carried out according to European application 86830340 5 the description of which is also herewith incorporated by for reference.

It is known that the solid state post-polycondensation reactions of the polyester resin are usually conducted at temperatures higher than 180° C. mainly higher than 195° C. (see page 3295 of Journal of Applied Poly. Sc. 28,3289–3300, 1989).

It is also known that the solid state polycondensation reactions mainly consist of post transesterification and esterification reactions which form as by-products ethylene glycol and water.

The diffusion of these by-products out the granules is a factor controlling the kinetic of the upgrading thus requiring high upgrading temperatures in order to obtain upgrading kinetics of practical interest.

In the solid state polyaddition process of this invention, in which the chain extension mechanism is based essentially on ring opening addition reactions which do not lead to the formation of by-products which could lower the kinetic of the upgrading reaction, upgrading temperatures comprised in a rather low range e.g. from 100° to 170° C. can therefore be used.

The possibility of using upgrading temperatures relatively low is an advantage because it makes it possible to upgrade polyester resins like copolyethyleneterephthalates (COPETs) with low melting points e.g. lower than 200° C., without having sticking problems in the reactor walls which problems cannot be avoided using the upgrading processes of the prior art which needs higher upgrading temperatures.

Generally the crystallization temperature is the same or lower than the temperature used in the upgrading reactor. The term upgrading reaction or process means a thermal treatment carried out on the solid polyester resin, which leads to an increase of the molecular weight of the resin.

By polyaddition or addition reaction it is meant a reaction between the terminal groups of the polyester resin and a substance having groups capable of addition reaction with the terminal groups, thus linearly extending the length of the polyester chain.

The upgrading additive used in the process of the invention is a dianhydride of an aromatic tetracarboxylic acid.

For dianhydride of an aromatic tetracarboxylic acid it is meant a compound containing at least two phthalic anhydride groups.

Preferably, the aromatic dianhydride is selected from the group consisting of pyromellitic dianhydride; 3,3', 4,4' benzophenone tetracarboxylic acid dianhydride; 2,2-bis(3,4 dicarboxyphenyl) propane dianhydride; 3,3', 4,4'-biphenyltetracarboxylic acid dianhydride, bis (3,4 dicarboxyphenyl) ether dianhydride; bis (3,4 dicarboxyphenyl) thioether dianhydride; 2,2-bis (3,4 dicarboxyphenyl) hexafluoropropane dianhydride; 2, 3, 6, 7-nephthalenetetracarboxylic acid dianhydride; bis (3,4-dicarboxyphenyl) sulfone dianhydride; 1, 2, 5, 6-naphthalenetetracarboxylic acid dianhydride; 2,2', 3,3'-byphenyltetracarboxylic acid dianhydride; bis (3,4-dicarboxyphenyl) sulfoxide dianhydride; 3, 4, 9, 10-perylene tetracarboxylic acid dianhydride and mixtures thereof.

Belong to the class of the aromatic dianhydrides also the compounds containing two phthalic anhydride groups, which are the reaction products of 2 moles of an aromatic anhydride such a pyromellitic dianhydride, with one mole of a glycol or other active hydrogen containing compounds.

The most preferred dianhydrides are the pyromellitic dianhydride (PMDA) and the dianhydride of 3,3', 4,4' benzophenonetetracarboxylic acid, and mixtures thereof.

With the term polyester resin is intended the polyesters comprising the polycondensation products of $C_2$ to $C_{10}$ glycols e.g. ethylene glycol, 1,4 butylene glycol, 1,4 cycloxylenglycol with terephthalic acid or reactive derivatives thereof e.g. dimethyl terephthalate, as well as polycondensation products containing besides units derived from terephthalic acid also units deriving from other dicarboxylic acids such as naphtalene dicarboxylic acid, isophthalic acid, orthophthalic acid and 5-tert-butyl-1,3 benzenedicarboxylic acid in amounts from about 0.5 to 25 mole per cent of the total acid units. Preferably the starting polyester resin has intrinsic viscosity lower than 0.8 dl/g. The process is particularly advantageous for alkylene terephthalates and copolyalkylene terephthalates utilized for injection molding, extrusion blow molding and extrusion applications such as tubing, film, sheets and foaming.

The blending of polyester resin with the dianhydride is preferably carried out in an equipment capable to perform reactive extrusion such as co-rotating or counter rotating intermeshing or non-intermeshing twin screw extruders with or without venting at a temperature between 200° and 350° C., depending on the melting point of the polymer or copolymer. A counter rotating non-intermeshing twin screw extruder is preferred. The use of such kind of extruder allows to perform a homogeneous distribution of the dianhydride in the melt and to avoid problems of local high concentrations of dianhydride due to its high reactivity.

The process may be performed continuously, that is without interruption between the production of the polyester in the molten state and the blending step. In this case the extruder is fed directly with the molten low molecular weight polyester resin.

The extruder may also be fed with solid polyester granules produced in another plant.

The extruder is preferably connected with a high vacuum oil seal pump to maintain a vacuum higher than 2 torr for the devolatization of acetaldehyde. The preferred concentration of dianhydride with respect to the polyester resin is 0.05–1% by weight.

The residence time in the extruder may be comprise between 10 and 120 sec., preferably 15–30 sec. The temperatures of the melt is related to the polyester or copolyester melting point and the kind of dianhydride used, and it is preferably comprised between 200° C. and 350° C.

To avoid local dishomogeneous concentration of the dianhydride in the melt, it is advisable to dilute the same with crystallized PET powder (1 part of dianhydride to 5 parts of PET powder). This procedure will ensure a homogeneous distribution of the additive in the melt leading to a better reproducibility of the end product intrinsic viscosity and inhibiting gel formation.

The dianhydride may also be diluted using blends of the dianhydride and crystallized PET-chips (1 part additive to 10 parts PET chips). The dilution could be performed in fanned blender using about 0.1% weight of polyethylenglycol or polycaprolactone, and similar products, as adhesives, and blending at a temperature of about 150° C.

The reactive melt coming out of the twin screw extruder is continuously pelletized using for instance an underwater pelletizer or a strand pelletizer system.

The crystallization and the solid state polyaddition steps are carried out under the temperature conditions already indicated.

The residence time in the crystallizer is comprised in the range of about 20–60 minutes; the residence time in the polyaddition reactor depends on the desired intrinsic viscosity values; generally it is comprised between 5 and 20 h.

The following examples are given to illustrate and not to limit the invention.

EXAMPLE 1

30 kg/h random COPET melt (15% isophthalic acid in weight, melting point 212° C., IV=0.75 dl/g) having a content of 110 ppm acetaldehyde were fed continuously from a PET/melt polycondensation pilot plant to a counter rotating non-intermeshing 30 mm twin screw extruder with venting capability.

220 g/h of a mixture of 20% weight of pyromellitic acid dianhydride (PMDA) in crystallized COPET powder (IV/0.75 dl/g; 15% weight isophthalic acid) were fed into the extruder using a gravimetric feeder. The test conditions were as follows:

| pyromellitic acid dianhydride in the COPET | |
|---|---|
| melt = 0.15% by weight | |
| screw speed: | 415 RPM |
| Ratio length-diameter (L/D): | 24 |
| Average residence time: | 18–25 sec. |
| Barrel temperature: | 235° C. |
| Product melt temperature: | 290° C. |
| Vacuum: | 1–5 torr |

A die with double holes was used as extruder die (Diameter: 7 mm).

A strand pelletizer was used to obtain the COPET-chips, which has a cylindrical shape with a diameter of 3 mm and a length of 5 mm, and with an intrinsic viscosity IV=0.85±0.01 dl/g, and a melting point of 212° C.

The COPET chips had an acetaldehyde content of 5–8 ppm.

The IV of the product remained constant over a test period of 2 weeks.

The COPET-chips were then fed continuously into a solid state polyaddition plant operating using the apparatus and the recycling conditions of the inert gas streams as described in European application EP 86830340.5.

The crystallization temperature was 150° C. and the residence time was 40 min. The temperature in the solid state polyaddition reactor was 150° C. and the residence time was 12 h.

The IV of the upgraded products was 0.94±0.02 dl/g.

The product was free from gel, with acetaldehyde content of 0.60 ppm.

In comparison, there was no upgrading of the starting COPET not added with PMDA (starting IV=0.75 dl/g), using the same conditions for crystallization and upgrading as above indicated.

EXAMPLE 2

The same COPET was used as in Example 1, but in the form of crystallized granules having IV=0.75 dl/g instead of COPET melt.

The crystallized COPET granules were dried and fed into the twin screw.

After extrusion the IV of the product was 0.845±0.02 dl/g.

The same conditions were used as in Example 1; only the average residence time was about 25 sec.

The temperature in the crystallizer was 130°–140° C. and 140° C. in the polyaddition reactor. The residence time in the reactor was 19 hours. The chips intrinsic viscosity after upgrading was 0.92±0.015 dl/g. The acetaldehyde content was 0.67 ppm.

EXAMPLE 3

The same COPET was used as in example 1 under the same test conditions as in example 1, but using a counter rotating non-intermeshing 30 mm twin screw extruder without venting capability.

The IV of the product was 0.83±0.015 dl/g.

The solid state conditions were 150°–155° C. in the crystallizer and 150° C. in the polyaddition reactor. The residence time in the reactor was 16 hours. The intrinsic viscosity of the upgraded chips was 0.93±0.02 dl/g; the acetaldehyde content 0.8 ppm.

Analytical procedures

The intrinsic viscosity was determined on a solution of 0.5 g. of polyester pellets in 100 ml. of a 60/40 by weight mixture of phenol and tetrachloroethane at 25° C. according to ASTM D 4603-86.

The acetaldehyde content was determined with a gas chromatography method, according to ASTM D 4526-85, using a Perkin Elmer gas chromatograph (Perkin Elmer model HS 101). The extraction conditions were 150° C. for 90 mins.

I claim:

1. Process for the continuous production of high molecular weight polyester resin from polyester resin having a lower molecular weight, comprising the steps of blending the resin in a molten state with an additive selected from the group of the dianhydrides of the aromatic tetracarboxylic acids, granulating the resin, subjecting the granules first to crystallization and then to solid state polyaddition, characterized in that the crystallization and the polyaddition steps are carried out at a temperature comprised between the TG of the resin and 170° C.

2. Process according to claim 1, characterized in that the dianhydride is selected from the group consisting of pyromellitic dianhydride; 2,2-bis(3,4-dicarboxyphenyl)propane dianhydride; 3,3',4,4'-biphenyltetracarboxylic acid dianhydride, bis(3,4-dicarboxyphenyl)ether dianhydride; bis(3,4-dicarboxyphenyl)thioether dianhydride; 3,3',4,4'benzophenonetetracarboxylic acid dianhydride; 2,2-bis(3,4-dicarboxyphenyl)hexafluoropropane dianhydride; 2,3,6,7-naphthalenetetracarboxylic acid dianhydride; 1,2,5,6-naphthalenetetracarboxylic acid dianhydride; 2,2',3,3'-biphenyltetracarboxylic acid dianhydride; bis(3,4-dicarboxyphenyl)sulfoxide dianhydride; 3,4,9,10-perylene tetracarboxylic acid dianhydride.

3. Process according to claim 2, characterized in that the dianhydride is pyromellitic dianhydride and 3,3',4,4'benzophenonetetracarboxylic acid dianhydride.

4. Process according to claim 1 characterized in that the dianhydride is used in amount form about 0.1 to 1% by weight in respect to the polyester resin.

5. Process according to claim 1 characterized in that the polyester resin is a copolyethyleneterephthalate containing up to 25% of units deriving from isophthalic acid and having a melting point lower than 220° C.

6. Process according to claim 1 characterized in that the said state polyaddition step is carried out at temperatures between 130° C. and 170° C.

7. Process according to claim 1 characterized in that the blending of the molten polyester with the aromatic tetracarboxylic acid dianhydride is performed in a twin screw extruder at temperatures between 200° C. and 350° C. and with average residence time less than 120 seconds.

8. Process according to claim 1 characterized in that the blending is performed in a counter-rotating non intermeshing twin screw extruder.

* * * * *